United States Patent
Maruyama et al.

(10) Patent No.: US 11,904,907 B2
(45) Date of Patent: Feb. 20, 2024

(54) AUTONOMOUS DRIVING VEHICLE, METHOD FOR CONTROLLING AUTONOMOUS DRIVING VEHICLE, AND PROGRAM

(71) Applicant: TOYOTA JIDOSHA KABUSHIKI KAISHA, Toyota (JP)

(72) Inventors: Shun Maruyama, Numazu (JP); Mitsutaka Tanimoto, Numazu (JP); Yutaka Aoki, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 139 days.

(21) Appl. No.: 17/577,911

(22) Filed: Jan. 18, 2022

(65) Prior Publication Data
US 2022/0234624 A1    Jul. 28, 2022

(30) Foreign Application Priority Data
Jan. 22, 2021   (JP) .................................. 2021-009092

(51) Int. Cl.
*B60W 60/00* (2020.01)
*B60W 50/08* (2020.01)
*B60W 40/105* (2012.01)

(52) U.S. Cl.
CPC ...... *B60W 60/0051* (2020.02); *B60W 40/105* (2013.01); *B60W 50/08* (2013.01); *B60W 2520/10* (2013.01); *B60W 2520/125* (2013.01); *B60W 2520/14* (2013.01); *B60W 2540/18* (2013.01)

(58) Field of Classification Search
CPC .......... B60W 60/0051; B60W 40/105; B60W 50/08; B60W 2520/10; B60W 2520/125; B60W 2520/14; B60W 2540/18
See application file for complete search history.

(56) References Cited

U.S. PATENT DOCUMENTS

| | | | |
|---|---|---|---|
| 2012/0041658 A1* | 2/2012 | Turner | B62D 15/0245 701/1 |
| 2019/0152471 A1 | 5/2019 | Mitsumoto et al. | |
| 2020/0398868 A1* | 12/2020 | Horii | B60W 50/14 |

FOREIGN PATENT DOCUMENTS

JP    2019-093765 A    6/2019

* cited by examiner

*Primary Examiner* — Nicholas Kiswanto
*Assistant Examiner* — Jamal A Shah
(74) *Attorney, Agent, or Firm* — Sughrue Mion, PLLC

(57) ABSTRACT

An autonomous driving vehicle includes a first reference straight steering angle acquisition unit configured to acquire a first reference straight steering angle which is a steering angle of the autonomous driving vehicle in a straight travelling state, a second reference straight steering angle acquisition unit configured to acquire a second reference straight steering angle which is the steering angle when a magnitude of a difference between an estimated yaw rate estimated from the steering angle of the autonomous driving vehicle and the yaw rate of the autonomous driving vehicle detected from the yaw rate sensor is less than a yaw rate threshold value, and an autonomous driving permission unit configured to permits an autonomous driving of the autonomous driving vehicle when both the first reference straight steering angle and the second reference straight steering angle are acquired.

5 Claims, 6 Drawing Sheets

Fig.1

*Fig.2A* FIRST REFERENCE STRAIGHT STEERING ANGLE

*Fig.2B* SECOND REFERENCE STRAIGHT STEERING ANGLE

*Fig.2C* STEERING HOLDING REQUEST

*Fig.2D* AUTONOMOUS DRIVING PERMISSION

AUTONOMOUS DRIVING VEHICLE, METHOD FOR CONTROLLING AUTONOMOUS DRIVING VEHICLE, AND PROGRAM

TECHNICAL FIELD

The present disclosure relates to an autonomous driving vehicle, a method for controlling the autonomous driving vehicle, and a program.

CROSS-REFERENCE TO RELATED APPLICATION

This application claims the benefit of priority from Japanese Patent Application No. 2021-009092, filed Jan. 22, 2021, the entire contents of which are incorporated herein by reference.

BACKGROUND

In the related art, Japanese Unexamined Patent Publication No. 2019-093765 is known as a technical document related to a vehicle behavior. This publication discloses a device that determines that a vehicle behavior is unstable based on a difference between a standard yaw rate calculated from a steering angle and an actual yaw rate.

SUMMARY

By the way, in order to perform autonomous driving, it is desirable to acquire all references, such as a straight steering angle, used for vehicle control. However, when the acquisition of the reference is strictly set as an essential condition for the autonomous driving, the autonomous driving cannot be started until the acquisition of the reference is completed, thereby causing a decrease in an operating rate of the autonomous driving.

According to a first aspect of the present disclosure, there is provided an autonomous driving vehicle capable of executing autonomous driving, including a first reference straight steering angle acquisition unit configured to acquire a first reference straight steering angle, which is a steering angle of the autonomous driving vehicle in a straight travelling state, based on lateral acceleration of the autonomous driving vehicle detected from a lateral acceleration sensor, a yaw rate of the autonomous driving vehicle detected from a yaw rate sensor, a vehicle speed of the autonomous driving vehicle detected from a vehicle speed sensor, and a steering angle of the autonomous driving vehicle detected from a steering sensor; a second reference straight steering angle acquisition unit configured to acquire a second reference straight steering angle which is the steering angle when a magnitude of a difference between an estimated yaw rate estimated from the steering angle of the autonomous driving vehicle and the yaw rate of the autonomous driving vehicle detected from the yaw rate sensor is less than a yaw rate threshold value; and an autonomous driving permission unit configured to permit an autonomous driving of the autonomous driving vehicle when both the first reference straight steering angle and the second reference straight steering angle are acquired, and not to permit the autonomous driving of the autonomous driving vehicle when the first reference straight steering angle or the second reference straight steering angle is not acquired, in which the autonomous driving permission unit makes a steering holding request for a driver of the autonomous driving vehicle and permits the autonomous driving of the autonomous driving vehicle when the first reference straight steering angle is acquired but the second reference straight steering angle is not acquired.

In the autonomous driving vehicle according to the first aspect of the present disclosure, when the autonomous driving cannot be permitted because the first reference straight steering angle is acquired but the second reference straight steering angle is not acquired, the autonomous driving is permitted by making the steering holding request for the driver and ensuring steering stability of the autonomous driving vehicle, so that the operating rate of autonomous driving can be increased as compared with a case where the autonomous driving is not permitted until both the first reference straight steering angle and the second reference straight steering angle are acquired.

The autonomous driving vehicle according to the aspect of the present disclosure described above may further include a steering holding determination unit configured to determine whether or not the driver performs steering holding, and the autonomous driving permission unit may repeatedly request the steering holding for the driver while it is determined that the driver does not perform the steering holding without acquisition of the second reference straight steering angle after the autonomous driving is permitted in response to the steering holding request.

The autonomous driving vehicle according to the aspect of the present disclosure described above may further include a steering holding determination unit configured to determine whether or not the driver performs steering holding, and the autonomous driving permission unit may cancel permission of the autonomous driving when a time in which it is determined that the driver is not performing the steering holding is continued for a certain time or more without acquisition of the second reference straight steering angle after the autonomous driving is permitted in response to the steering holding request.

According to another aspect of the present disclosure, there is provided a method for controlling an autonomous driving vehicle capable of executing autonomous driving, the method including acquiring a first reference straight steering angle, which is a steering angle of the autonomous driving vehicle in a straight travelling state, based on lateral acceleration of the autonomous driving vehicle detected from a lateral acceleration sensor, a yaw rate of the autonomous driving vehicle detected from a yaw rate sensor, a vehicle speed of the autonomous driving vehicle detected from a vehicle speed sensor, and a steering angle of the autonomous driving vehicle detected from a steering sensor; acquiring a second reference straight steering angle which is the steering angle when a magnitude of a difference between an estimated yaw rate estimated from the steering angle of the autonomous driving vehicle and the yaw rate of the autonomous driving vehicle detected from the yaw rate sensor is less than a yaw rate threshold value; and permitting an autonomous driving of the autonomous driving vehicle when both the first reference straight steering angle and the second reference straight steering angle are acquired, and not permitting the autonomous driving of the autonomous driving vehicle when the first reference straight steering angle or the second reference straight steering angle is not acquired, in which, in the permitting of the autonomous driving, the autonomous driving of the autonomous driving vehicle is permitted by making a steering holding request for a driver of the autonomous driving vehicle when the first reference straight steering angle is acquired but the second reference straight steering angle is not acquired.

In the method for controlling an autonomous driving vehicle according to another aspect of the present disclosure, when the autonomous driving cannot be permitted because the first reference straight steering angle is acquired but the second reference straight steering angle is not acquired, the autonomous driving is permitted by making the steering holding request for the driver and ensuring steering stability of the autonomous driving vehicle, so that the operating rate of autonomous driving can be increased as compared with a case where the autonomous driving is not permitted until both the first reference straight steering angle and the second reference straight steering angle are acquired.

According to further another aspect of the present disclosure, there is provided a program causing an autonomous driving ECU of an autonomous driving vehicle to operate as: a first reference straight steering angle acquisition unit configured to acquire a first reference straight steering angle, which is a steering angle of the autonomous driving vehicle in a straight travelling state, based on lateral acceleration of the autonomous driving vehicle detected from a lateral acceleration sensor, a yaw rate of the autonomous driving vehicle detected from a yaw rate sensor, a vehicle speed of the autonomous driving vehicle detected from a vehicle speed sensor, and a steering angle of the autonomous driving vehicle detected from a steering sensor; a second reference straight steering angle acquisition unit configured to acquire a second reference straight steering angle which is the steering angle when a magnitude of a difference between an estimated yaw rate estimated from the steering angle of the autonomous driving vehicle and the yaw rate of the autonomous driving vehicle detected from the yaw rate sensor is less than a yaw rate threshold value; and an autonomous driving permission unit configured to permit an autonomous driving of the autonomous driving vehicle when both the first reference straight steering angle and the second reference straight steering angle are acquired, and not to permit the autonomous driving of the autonomous driving vehicle when the first reference straight steering angle or the second reference straight steering angle is not acquired, in which the autonomous driving permission unit makes a steering holding request for a driver of the autonomous driving vehicle and permits the autonomous driving of the autonomous driving vehicle when the first reference straight steering angle is acquired but the second reference straight steering angle is not acquired.

In the program according to further another aspect of the present disclosure, when the autonomous driving cannot be permitted because the first reference straight steering angle is acquired but the second reference straight steering angle is not acquired, the autonomous driving is permitted by making the steering holding request for the driver and ensuring steering stability of the autonomous driving vehicle, so that the operating rate of autonomous driving can be increased as compared with a case where the autonomous driving is not permitted until both the first reference straight steering angle and the second reference straight steering angle are acquired.

According to each of the aspects of the present disclosure, the operating rate of the autonomous driving can be increased.

DETAILED DESCRIPTION

Hereinafter, an embodiment of the present disclosure will be described with reference to the accompanying drawings.

Figure 1:
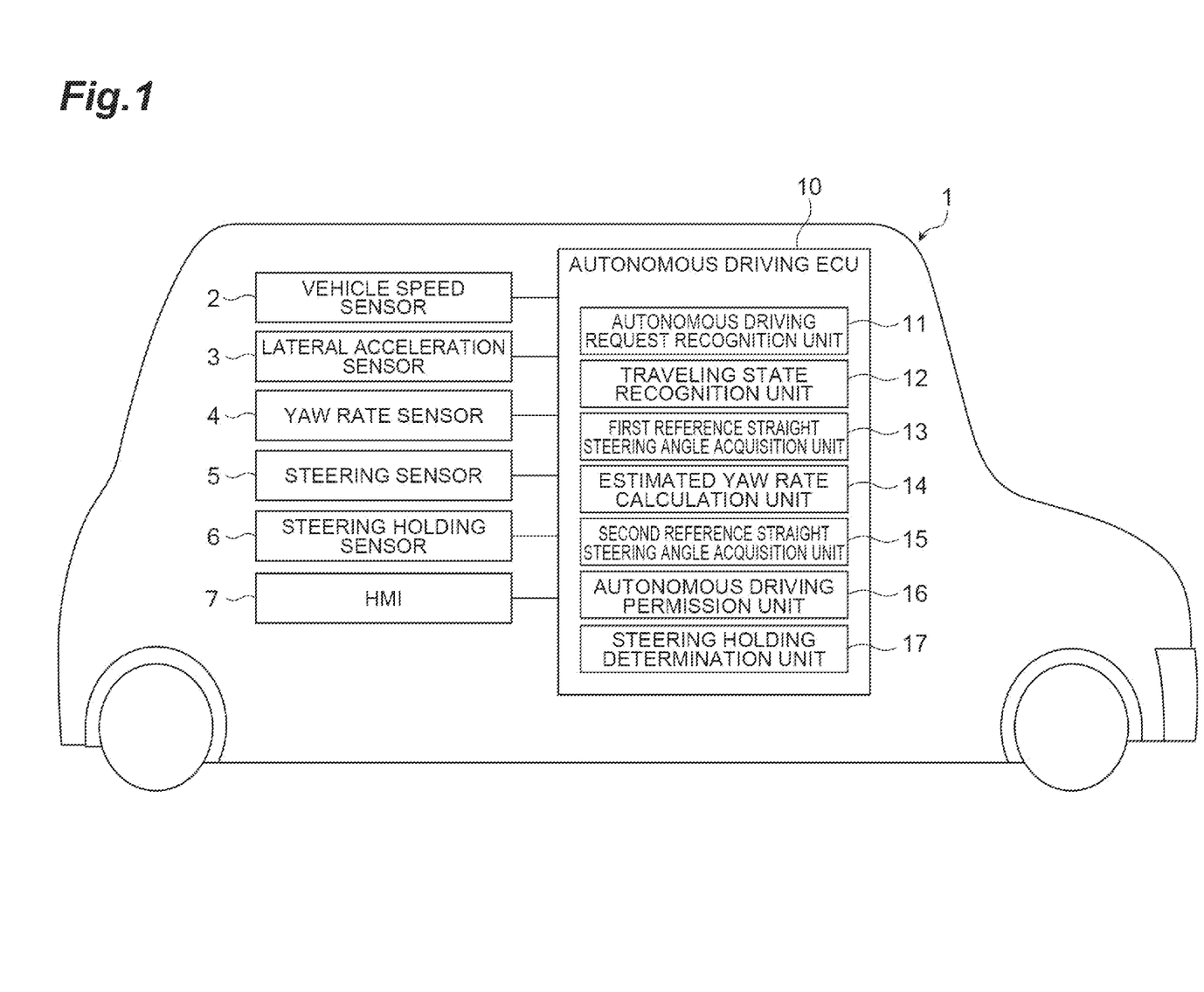
FIG. 1 is a block diagram showing an autonomous driving vehicle according to an embodiment.

FIG. 1 is a block diagram showing an autonomous driving vehicle according to an embodiment. The autonomous driving vehicle 1 shown in FIG. 1 is a vehicle having an autonomous driving function capable of executing autonomous driving. The autonomous driving vehicle 1 is, for example, a four-wheeled vehicle. The autonomous driving vehicle 1 may be a vehicle having four or more wheels, and may be a two-wheeled vehicle or a three-wheeled vehicle. The autonomous driving is vehicle control for causing a vehicle to automatically travel along a road on which the autonomous driving vehicle 1 travels or a preset route [path].

[Configuration Of Autonomous Driving Vehicle]

The autonomous driving vehicle 1 includes an autonomous driving ECU 10 for realizing autonomous driving. The autonomous driving ECU 10 is an electronic control unit having a Central Processing Unit (CPU) and a storage unit such as a Read Only Memory (ROM) or a Random Access Memory (RAM). In the autonomous driving ECU 10, for example, various functions are realized by operating a program stored in the storage unit on the CPU. The autonomous driving ECU 10 may include a plurality of electronic units.

A vehicle speed sensor 2, a lateral acceleration sensor 3, a yaw rate sensor 4, a steering sensor 5, a steering holding sensor 6, and an HMI 7 are connected to the autonomous driving ECU 10.

The vehicle speed sensor 2 is a detector that detects a speed of the autonomous driving vehicle 1. As the vehicle speed sensor, for example, a wheel speed sensor is used which is provided on a wheel of the autonomous driving vehicle 1, a drive shaft that rotates integrally with the wheel, or the like to detect a rotation speed of the wheel. The vehicle speed sensor transmits detected vehicle speed information (wheel speed information) to the autonomous driving ECU 10.

The lateral acceleration sensor 3 is a detector that detects lateral acceleration of the autonomous driving vehicle 1. As the lateral acceleration sensor 3, for example, a capacitance type acceleration sensor can be used. The lateral acceleration sensor 3 may be configured as a sensor integrated with a front-rear acceleration sensor. The lateral acceleration sensor 3 transmits lateral acceleration information of the autonomous driving vehicle 1 to the autonomous driving ECU 10.

The yaw rate sensor 4 is a detector that detects a yaw rate (rotation angular speed) around a vertical shaft at a center of gravity of the autonomous driving vehicle 1. As the yaw rate sensor 4, for example, a gyro sensor can be used. The yaw rate sensor 4 transmits detected yaw rate information of the autonomous driving vehicle 1 to the autonomous driving ECU 10.

The steering sensor 5 is a detector that detects a steering angle of the autonomous driving vehicle 1. The steering sensor 5 is provided on, for example, a steering shaft to detect the steering angle of the autonomous driving vehicle 1. The steering sensor 5 transmits detected steering angle information of the autonomous driving vehicle 1 to the autonomous driving ECU 10.

The steering holding sensor 6 is a detector that detects steering wheel holding of a driver. The steering holding sensor 6 can be, for example, a pressure sensor that is provided on the steering wheel to detect a gripping force of the steering wheel. The steering holding sensor 6 transmits steering wheel holding information by the driver to the autonomous driving ECU 10. The steering holding sensor 6 does not necessarily need to be provided. The steering wheel holding of the driver may be detected from a behavior change in the steering angle by the steering sensor 5.

The Human Machine Interface (HMI) 7 is an interface for performing input and output of information between the autonomous driving vehicle 1 and an occupant including the driver. The HMI 7 includes a display and a speaker. The HMI 7 performs an image output of the display and a voice output from a speaker in response to a control signal from the autonomous driving ECU 10. The display may include a meter display unit.

Next, a functional configuration of the autonomous driving ECU 10 will be described. As shown in FIG. 1, the autonomous driving ECU 10 includes an autonomous driving request recognition unit 11, a traveling state recognition unit 12, a first reference straight steering angle acquisition unit 13, an estimated yaw rate calculation unit 14, and a second reference straight steering angle acquisition unit 15, an autonomous driving permission unit 16 and a steering holding determination unit 17.

The autonomous driving request recognition unit 11 recognizes that an autonomous driving start request is made by a user including the driver of the autonomous driving vehicle 1. The autonomous driving request recognition unit 11 recognizes the autonomous driving start request by an operation of an autonomous driving start button by, for example, the driver. The autonomous driving request recognition unit 11 may recognize the autonomous driving start request from voice recognition of the driver or an instruction of a mobile terminal of the user. The autonomous driving request recognition unit 11 may recognize that the autonomous driving start request is made with engine start by presetting by the user. A method for recognizing the autonomous driving start request is not particularly limited, and various well-known methods can be adopted.

The traveling state recognition unit 12 recognizes a traveling state of the autonomous driving vehicle. The traveling state includes a vehicle speed of the autonomous driving vehicle, lateral acceleration of the autonomous driving vehicle, a yaw rate of the autonomous driving vehicle, and steering angle information of the autonomous driving vehicle. Specifically, the traveling state recognition unit 12 recognizes the vehicle speed of the autonomous driving vehicle based on the vehicle speed information of the vehicle speed sensor 2. The traveling state recognition unit 12 recognizes the lateral acceleration of the autonomous driving vehicle based on the lateral acceleration information of the lateral acceleration sensor 3. The traveling state recognition unit 12 recognizes the yaw rate of the autonomous driving vehicle based on the yaw rate information of the yaw rate sensor 4. The traveling state recognition unit 12 recognizes the steering angle of the autonomous driving vehicle based on the steering angle information of the steering sensor 5.

The first reference straight steering angle acquisition unit 13 acquires a first reference straight steering angle for autonomous driving control when the autonomous driving start request is recognized by the autonomous driving request recognition unit 11. The first reference straight steering angle for autonomous driving control is a reference for a straight steering angle used for vehicle control in the autonomous driving.

The first reference straight steering angle acquisition unit 13 acquires the first reference straight steering angle for autonomous driving control, which is the steering angle of the autonomous driving vehicle 1 in the straight state, based on the vehicle speed detected from the vehicle speed sensor 2, the lateral acceleration detected from the lateral acceleration sensor 3, the yaw rate detected from the yaw rate sensor 4, and the steering angle detected from the steering sensor 5.

Specifically, the first reference straight steering angle acquisition unit 13 determine whether or not the autonomous driving vehicle 1 is in the straight state based on the vehicle speed detected by the vehicle speed sensor 2, the lateral acceleration detected by the lateral acceleration sensor 3, and the yaw rate detected by the yaw rate sensor 4. For example, the first reference straight steering angle acquisition unit 13 determines that the autonomous driving vehicle 1 is in the straight state when the vehicle speed is equal to or higher than a vehicle speed determination threshold value for straight determination, the lateral acceleration is lower than a lateral acceleration determination threshold value for straight determination, and the yaw rate is lower than a yaw rate determination threshold value for straight determination. The vehicle speed determination threshold value, the lateral acceleration determination threshold value, and the yaw rate determination threshold value are threshold values having preset values.

The first reference straight steering angle acquisition unit 13 acquires an average value of the steering angle of the autonomous driving vehicle 1 in the straight state at a certain time as the first reference straight steering angle. The certain time is not particularly limited, and may be, for example, 20 seconds. The first reference straight steering angle acquisition unit 13 does not necessarily need to use the average value for acquisition of the first reference straight steering angle, may be a median value, and may acquire the first reference straight steering angle using a predetermined arithmetic formula from a detection result of the steering angle in the straight state.

The estimated yaw rate calculation unit 14 calculates the estimated yaw rate generated in the autonomous driving vehicle 1 based on the steering angle detected by the steering sensor 5. The estimated yaw rate is a yaw rate estimated from a change in the steering angle. Various well-known methods can be adopted as a method for calculating the estimated yaw rate.

The second reference straight steering angle acquisition unit 15 acquires a second reference straight steering angle for vehicle behavior determination when the autonomous driving request recognition unit 11 recognizes the autonomous driving start request. The second reference straight steering angle for the vehicle behavior determination is a reference of a straight steering angle for determining an abnormality in the vehicle behavior of the autonomous driving vehicle 1 during the autonomous driving. In the vehicle behavior determination, it is determined whether or not a posture of the autonomous driving vehicle 1 is unstable due to, for example, a crosswind. The vehicle behavior determination is used for executing well-known vehicle stability control such as Steering-assisted Vehicle Stability Control (S-VSC).

The second reference straight steering angle acquisition unit 15 acquires the second reference straight steering angle from a steering angle (a steering angle detected by the steering sensor 5) when a yaw rate deviation, which is a difference between the estimated yaw rate calculated by the estimated yaw rate calculation unit 14 and the yaw rate (actual yaw rate) detected by the yaw rate sensor 4, is less than a yaw rate threshold value. The yaw rate threshold value is a threshold value of a preset value for acquiring the second reference straight steering angle. The yaw rate threshold value may be zero.

For example, the second reference straight steering angle acquisition unit 15 acquires, as the second reference straight steering angle, the average value of the steering angles at a certain time when the yaw rate deviation is less than the yaw rate threshold value. The certain time is not particularly limited, and is, for example, 20 seconds. The second reference straight steering angle acquisition unit 15 does not necessarily need to use the average value for acquiring the second reference straight steering angle, and may be a median value. The second reference straight steering angle acquisition unit 15 may acquire, as the second reference straight steering angle, a detected value of the steering angle at a moment when the yaw rate deviation is less than the yaw rate threshold value, and may obtain the second reference straight steering angle from the detected value of the steering angle when the yaw rate deviation is less than the yaw rate threshold value using a predetermined arithmetic formula.

When the first reference straight steering angle is acquired by the first reference straight steering angle acquisition unit 13 and the second reference straight steering angle is acquired by the second reference straight steering angle acquisition unit 15, the autonomous driving permission unit 16 permits the autonomous driving of the autonomous driving vehicle 1. On the other hand, when the first reference straight steering angle or the second reference straight steering angle is not acquired, the autonomous driving permission unit 16 basically does not to permit the autonomous driving.

When the autonomous driving start request is recognized by the autonomous driving request recognition unit 11, the first reference straight steering angle is acquired by the first reference straight steering angle acquisition unit 13, but the second reference straight steering angle is not acquired by the by the second reference straight steering angle acquisition unit 15, the autonomous driving permission unit 16 makes a steering holding request for the driver of the autonomous driving vehicle 1 and permits the autonomous driving of the autonomous driving vehicle 1.

The steering holding request is a request for the driver to hold the steering wheel of the autonomous driving vehicle 1. The steering holding request is made, for example, by performing image display of the display of the autonomous driving vehicle 1. The autonomous driving permission unit 16 transmits the control signal to the HMI 7 to execute the steering holding request.

The image display of the display may include icon display or text display on the meter display unit, may include an icon display on the Multi Information Display (MID), and may include an image or text projection display on a front window of the autonomous driving vehicle 1 by a Head Up Display (HUD). The steering holding request may be made by blinking a lighting unit provided on the steering wheel, or may be made by sound output (or voice output) from the speaker of the autonomous driving vehicle 1.

Figure 2A:
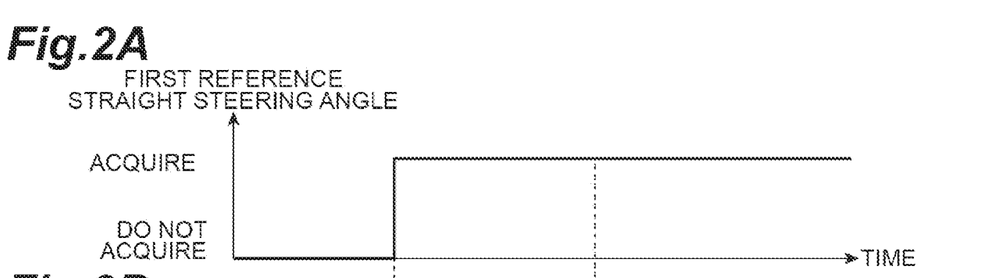
FIGS. 2A to 2D are graphs showing an example of a timing chart for autonomous driving permission.
Figure 2B:
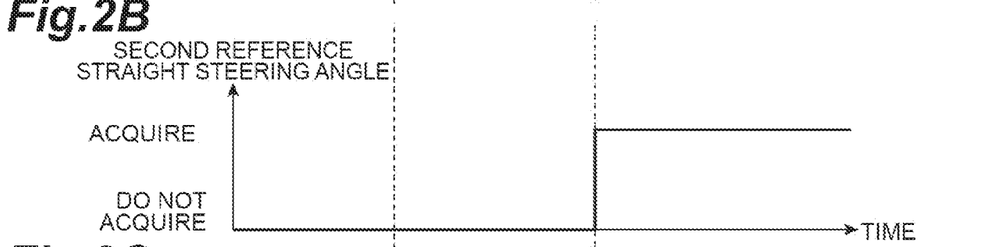
Figure 2C:
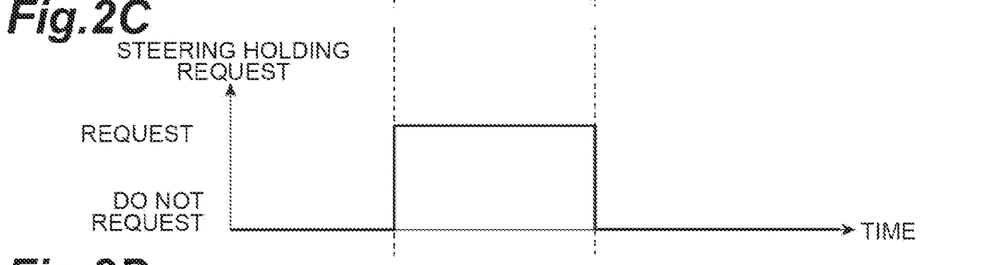
Figure 2D:
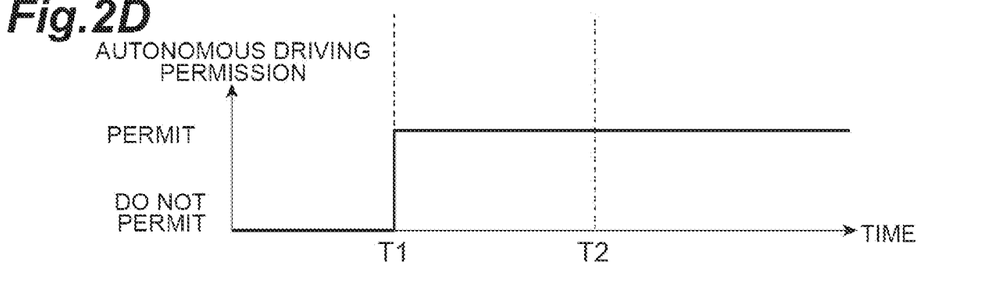

Here, FIGS. 2A to 2D are diagrams showing an example of a timing chart for autonomous driving permission. Here, it is assumed that the autonomous driving request recognition unit 11 recognizes the autonomous driving start request. FIG. 2A is a chart showing an acquisition timing of the first reference straight steering angle. FIG. 2B is a chart showing an acquisition timing of the second reference straight steering angle. FIG. 2C is a chart showing a timing of the steering holding request. FIG. 2D is a chart showing a timing for the autonomous driving permission. FIGS. 2A to 2D show time T1 at which the first reference straight steering angle is acquired and time T2 at which the second reference straight steering angle is acquired. Time T2 is a time after time T1.

At time T1 shown in FIGS. 2A to 2D, the first reference straight steering angle is acquired but the second reference straight steering angle is not yet acquired, so that the autonomous driving permission unit 16 executes the steering holding request for the driver. At time T2, the second reference straight steering angle is acquired, so that the autonomous driving permission unit 16 ends the steering holding request for the driver.

Further, as shown in FIGS. 2A to 2D, the first reference straight steering angle is acquired and the second reference straight steering angle is not acquired at time T1, but the steering holding request for the driver is made, so that the autonomous driving permission unit 16 acquires performs the autonomous driving permission. As a result, in the autonomous driving vehicle 1, as compared with a case where the autonomous driving is not permitted until the second reference straight steering angle is acquired, it is possible to permit the autonomous driving from time T1, so that it is possible to improve the operating rate of the autonomous driving.

The autonomous driving permission unit 16 does not necessarily need to permit the autonomous driving simultaneously with the steering holding request for the driver. The autonomous driving permission unit 16 may permit the autonomous driving after a predetermined margin time elapses after the steering holding request for the driver is made.

Even when the autonomous driving permission unit 16 performs the autonomous driving permission, the autonomous driving of the autonomous driving vehicle 1 is not executed. The autonomous driving vehicle 1 does not execute the autonomous driving when a predetermined autonomous driving condition is not satisfied due to failures of the necessary sensors that detect external environment of a vehicle.

When the autonomous driving permission unit 16 makes the steering holding request for the driver, the steering holding determination unit 17 determines whether or not the driver performs the steering holding. The steering holding indicates that the driver holds the steering wheel. The steering holding may be limited to holding in the straight state.

For example, based on a detection result of the steering holding sensor 6, when the driver continues a state of holding the steering wheel for a certain time or more, the steering holding determination unit 17 determines that the driver performs the steering holding. The steering holding determination unit 17 may determine whether or not the driver holds the steering wheel based on a change in the steering angle detected from the steering sensor 5. The steering holding determination unit 17 may determine the steering holding by using a captured image of a driver monitor camera that captures an image of the driver. A method for determining the steering holding is not particularly limited, and various well-known methods can be adopted.

When the steering holding of the driver is not determined by the steering holding determination unit 17, the autonomous driving permission unit 16 repeatedly requests the steering holding until the second reference straight steering angle acquisition unit 15 acquires the second reference straight steering angle. In other words, when the steering holding determination unit 17 determines the steering holding of the driver, the autonomous driving permission unit 16 ends the steering holding request even when the second reference straight steering angle is not acquired.

Figure 3A:
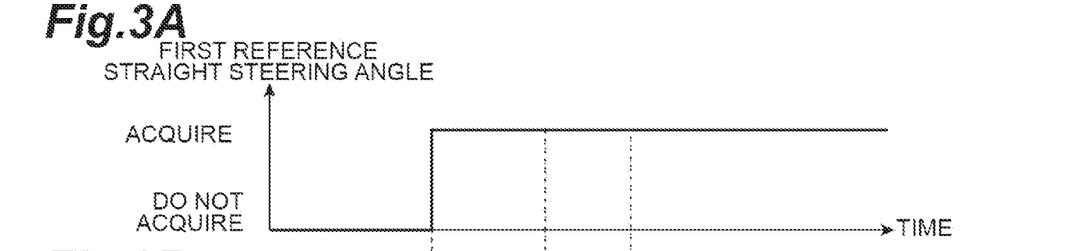
FIGS. 3A to 3E are graphs showing an example of a timing chart when a steering holding request ends based on steering holding determination.
Figure 3B:
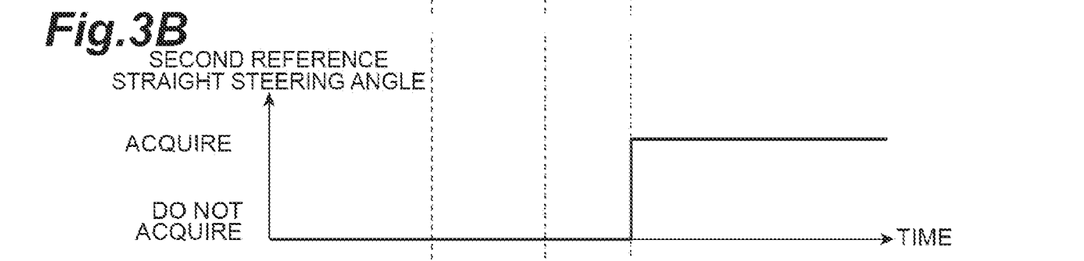
Figure 3C:
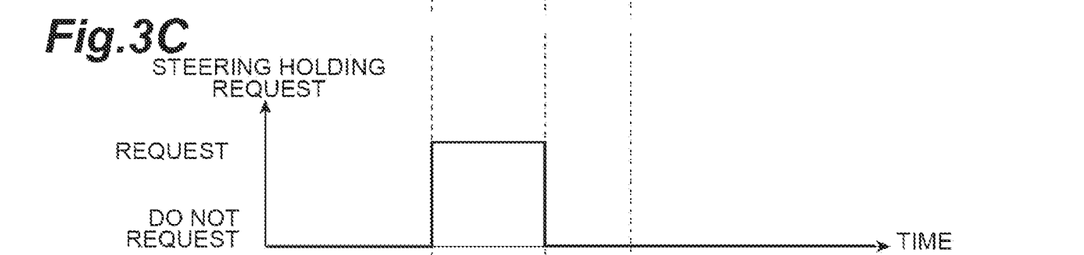
Figure 3D:
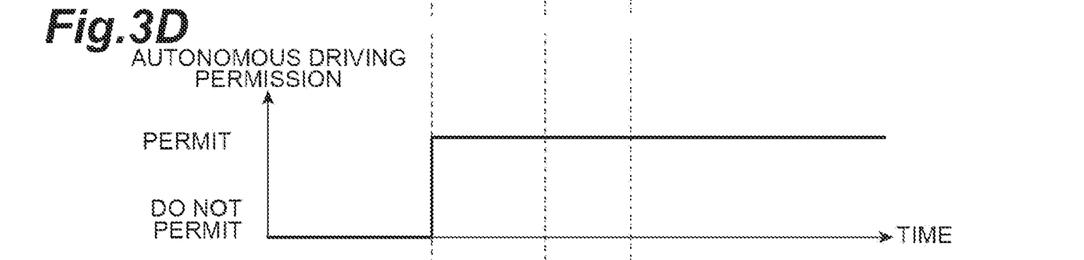

Here, FIGS. 3A to 3E are graphs showing an example of a timing chart when the steering holding request ends based on steering holding determination. Since FIGS. 3A, 3B, and 3D are the same as FIGS. 2A, 2B, 2D, the description thereof will be omitted.

Figure 3E:
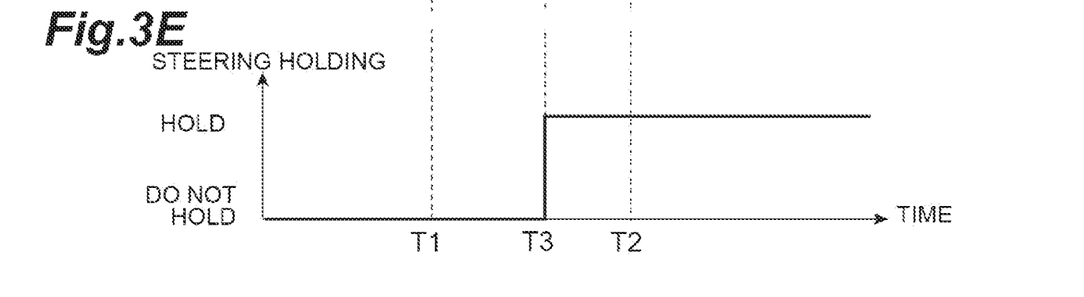

FIG. 3C is a chart showing a start timing and an end timing of the steering holding request. FIG. 3E is a chart showing a steering holding determination timing FIGS. 3A to 3E shows time T3 at which the steering holding of the driver is determined. Time T3 is a time between time T1 and time T2.

At time T1 in FIGS. 3A to 3E, the autonomous driving permission unit 16 makes the steering holding request for the driver. Thereafter, the autonomous driving permission unit 16 repeatedly requests the steering holding for the driver until the steering holding of the driver is determined at time T3. The autonomous driving permission unit 16 ends the steering holding request based on the determination of the steering holding of the driver at time T3.

The autonomous driving permission unit 16 may change to an aspect (an aspect with a strong degree of stimulation) in which the driver easily notices the repeated steering holding request, as compared with an initial steering holding request. The autonomous driving permission unit 16 may increase brightness of the image display as compared with the initial steering holding request in the repeated steering holding requests. When only the image display is performed from the display in the initial steering holding request, the autonomous driving permission unit 16 may add the sound output (or voice output) from the speaker in the repeated steering holding request. The autonomous driving permission unit 16 may increase the brightness of the image display or volume of the sound output each time of repetition. The autonomous driving permission unit 16 may add vibration of the steering wheel or a driver's seat in repeated steering holding requests.

Further, when the steering holding of the driver is not determined by the steering holding determination unit 17 and a certain time elapses without acquisition of the second reference straight steering angle by the second reference straight steering angle acquisition unit 15, the autonomous driving permission unit 16 cancels permission of the autonomous driving. The certain time is not particularly limited. The certain time may be 3 minutes, 5 minutes, or 1 minute.

Figure 4A:
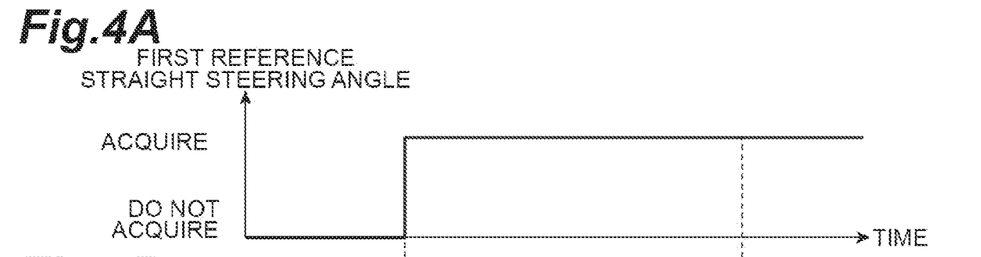
FIGS. 4A to 4E are graphs showing an example of a timing chart when the autonomous driving permission is cancelled because steering holding is not performed.
Figure 4B:
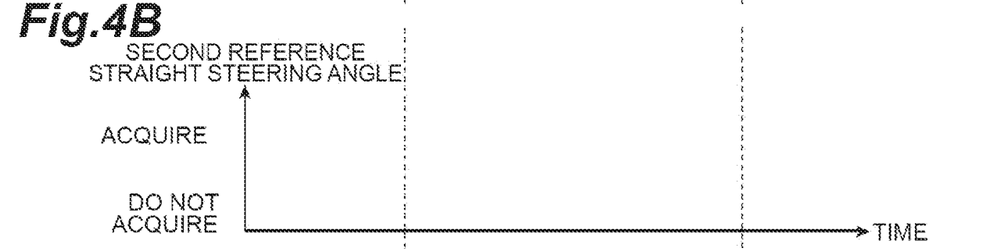
Figure 4C:
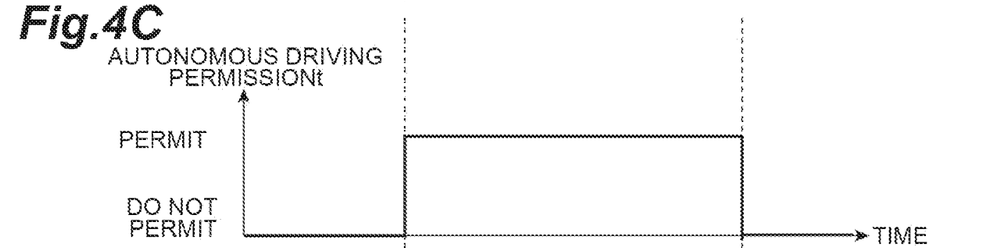
Figure 4D:
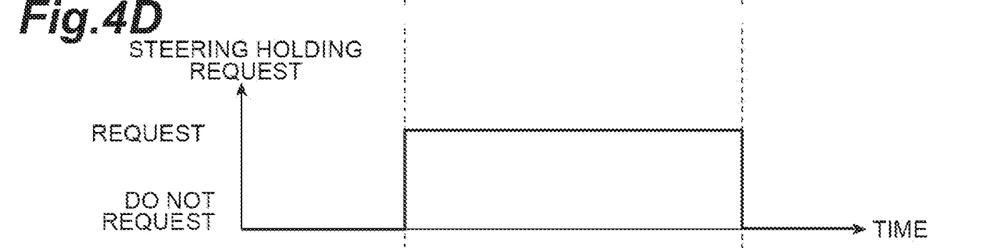
Figure 4E:
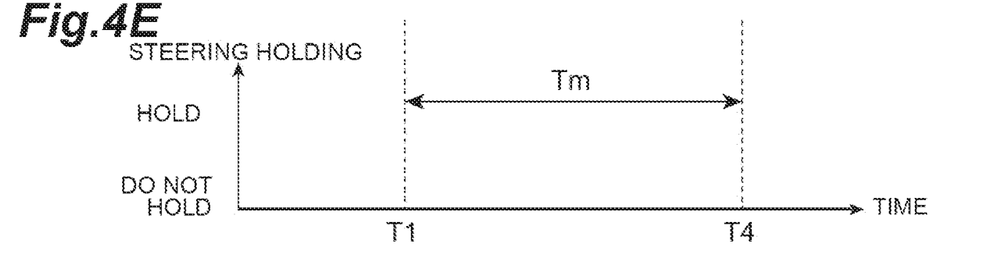

FIGS. 4A to 4E are diagrams showing an example of a timing chart when the autonomous driving permission is cancelled due to the steering holding is not performed. Since FIG. 4A is the same as FIG. 2A, the description thereof will be omitted. FIG. 4B is a chart showing a state in which the second reference straight steering angle cannot be acquired for a long time. FIG. 4C is a chart showing the time in which the steering holding request is made. FIG. 4D is a chart showing time until the autonomous driving permission is cancelled. FIG. 4E is a chart showing a situation in which the steering holding of the driver is not determined. FIGS. 4A to 4E show time T4 at which the autonomous driving permission is cancelled and certain time Tm until the autonomous driving permission is cancelled. Time T4 is a time after time T1.

FIGS. 4A to 4E, at time T1, the autonomous driving permission unit 16 makes the steering holding request for the driver and simultaneously performs the autonomous driving permission. However, in FIGS. 4A to 4E, time elapses while the steering holding determination unit 17 does not determine the steering holding of the driver without acquisition of the second reference straight steering angle by the second reference straight steering angle acquisition unit. During this time, the autonomous driving permission unit 16 repeatedly requests the steering holding for the driver.

At time T4 in FIGS. 4A to 4E, the certain time Tm elapses while the steering holding of the driver is not determined without acquisition of the second reference straight steering angle, so that the autonomous driving permission unit 16 cancels permission of the autonomous driving. When the autonomous driving is already performed, the autonomous driving vehicle 1 notifies the driver of the end of the autonomous driving and shifts to manual driving (driving support state).

[Program]

A program causes the autonomous driving ECU 10 of the autonomous driving vehicle 1 to function (operate) as the autonomous driving request recognition unit 11, the traveling state recognition unit 12, the first reference straight steering angle acquisition unit 13, the estimated yaw rate calculation unit 14, the second reference straight steering angle acquisition unit 15, the autonomous driving permission unit 16, and the steering holding determination unit 17, which are described above. The program is provided by a non-temporary recording medium such as a ROM or a semiconductor memory. In addition, the program may be provided via communication such as a network.

[Method For Controlling Autonomous Driving Vehicle]

Figure 5:
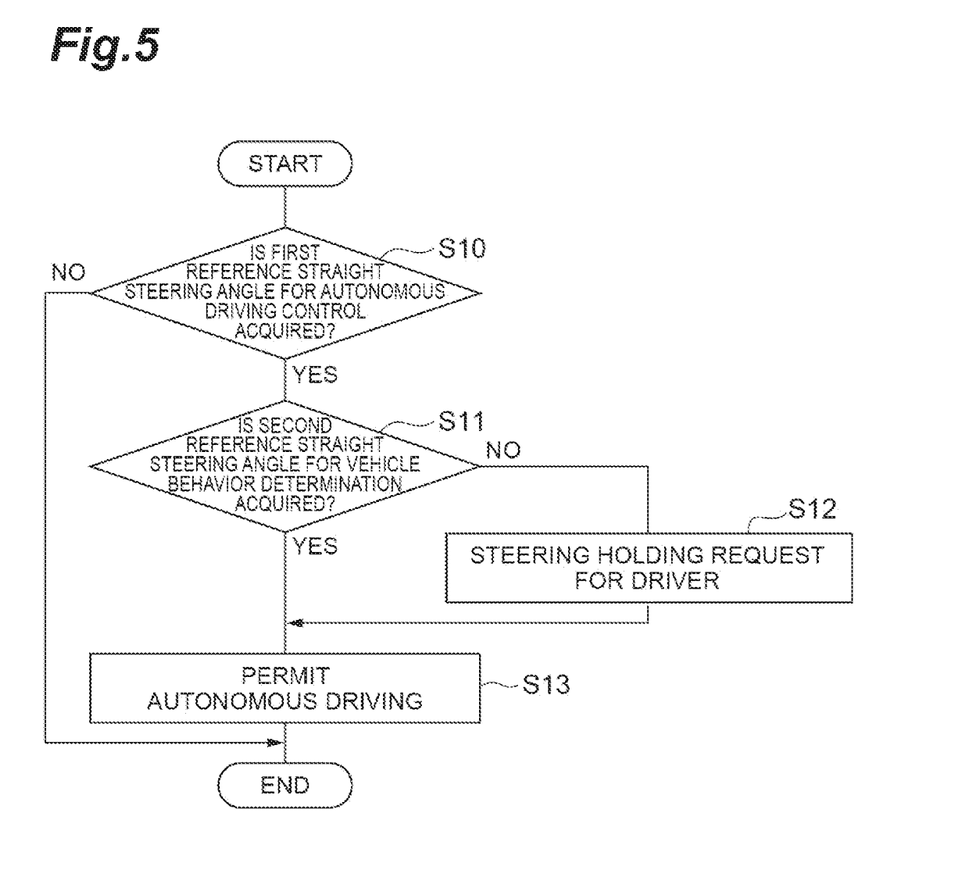
FIG. 5 is a flowchart showing an example of an autonomous driving permission process.

Next, a method for controlling the autonomous driving vehicle 1 according to the present embodiment will be described with reference to the drawings. FIG. 5 is a flowchart showing an example of an autonomous driving permission process. For example, the autonomous driving permission process is executed when the autonomous driving request recognition unit 11 recognizes the autonomous driving start request.

As shown in FIG. 5, the autonomous driving ECU 10 of the autonomous driving vehicle 1 determines whether or not the first reference straight steering angle acquisition unit 13 acquires the first reference straight steering angle for autonomous driving control (first reference straight steering angle acquisition step) in S10. The first reference straight steering angle acquisition unit 13 acquires the first reference straight steering angle for autonomous driving control, which is the steering angle of the autonomous driving vehicle 1 in the straight state, based on the vehicle speed detected from the vehicle speed sensor 2, the lateral acceleration detected from the lateral acceleration sensor 3, the yaw rate detected from the yaw rate sensor 4, and the steering angle detected from the steering sensor 5.

When the autonomous driving ECU 10 determines that the first reference straight steering angle for autonomous driving control is acquired (S10: YES), the process proceeds to S11. When the autonomous driving ECU 10 does not determine that the first reference straight steering angle for autonomous driving control is not acquired (S10: NO), the current process ends. In this case, the autonomous driving is not permitted. Thereafter, the autonomous driving ECU 10 repeats the determination in S10 again.

In S11, the autonomous driving ECU 10 acquires the second reference straight steering angle for vehicle behavior determination by the second reference straight steering angle acquisition unit 15 (second reference straight steering angle acquisition step). The second reference straight steering angle acquisition unit 15 acquires the second reference straight steering angle from the steering angle when the yaw rate deviation, which is the difference between the estimated yaw rate calculated by the estimated yaw rate calculation unit 14 and the yaw rate detected by the yaw rate sensor 4, is less than the yaw rate threshold value.

When the autonomous driving ECU 10 determines that the second reference straight steering angle for vehicle behavior determination is acquired (S11: YES), the process proceeds to S13. When the autonomous driving ECU 10 does not determine that the second reference straight steering angle for vehicle behavior determination is not acquired (S11: NO), the process proceeds to S12.

In S12, the autonomous driving ECU 10 makes the steering holding request for the driver by the autonomous driving permission unit 16 (steering holding request step). The steering holding request is made, for example, through the image display on the meter display unit of the autonomous driving vehicle 1. Thereafter, the autonomous driving ECU 10 proceeds to S13.

In S13, the autonomous driving ECU 10 permits the autonomous driving by the autonomous driving permission unit 16 (autonomous driving permission step). Thereafter, the autonomous driving ECU 10 ends the current autonomous driving permission process.

Figure 6:
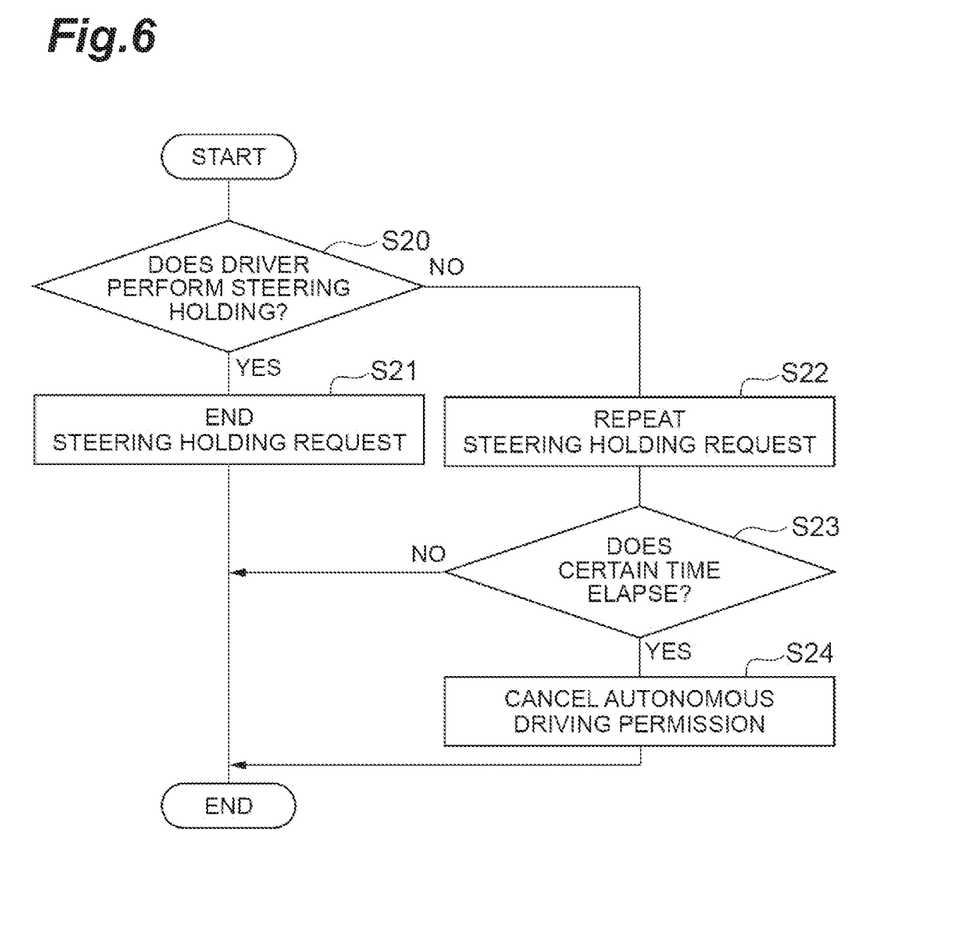
FIG. 6 is a flowchart showing an example of an autonomous driving cancellation process.

FIG. 6 is a flowchart showing an example of an autonomous driving cancellation process. The autonomous driving cancellation process is executed when the autonomous driving is permitted in the autonomous driving permission process shown in FIG. 5 and the second reference straight steering angle is not acquired. When the second reference straight steering angle is acquired, the process ends even in the middle of the autonomous driving cancellation process.

As shown in FIG. 6, the autonomous driving ECU 10 determines whether or not the driver performs the steering holding by the steering holding determination unit 17 in S20 (steering holding determination step). For example, based on a detection result of the steering holding sensor 6, when the driver continues a state of holding the steering wheel for a certain time or more, the steering holding determination unit 17 determines that the driver performs the steering holding.

When the autonomous driving ECU 10 determines that the driver performs the steering holding (S20: YES), the process proceeds to S21. When the autonomous driving ECU 10 does not determine that the driver performs the steering holding (S20: NO), the process proceeds to S22.

In S21, the autonomous driving ECU 10 ends the steering holding request by the autonomous driving permission unit 16 (steering holding request end step). Thereafter, the autonomous driving ECU 10 ends the current autonomous driving cancellation process.

In S22, the autonomous driving ECU 10 repeatedly requests the steering holding by the autonomous driving permission unit 16 (repeated steering holding request step). The autonomous driving permission unit 16 transmits a control signal to the HMI 7 to repeat the steering holding request for the driver. The autonomous driving permission unit 16 may change to the aspect in which the driver easily notices the repeated steering holding request, as compared with the initial steering holding request. Thereafter, the autonomous driving ECU 10 proceeds to S23.

In S23, the autonomous driving ECU 10 determines whether or not a certain time elapses in a state in which the steering holding of the driver is not determined from the steering holding request by the steering holding determination unit 17 (certain time determination step). When the autonomous driving ECU 10 determines that the certain time elapses in the state in which the steering holding of the driver is not determined (S23: YES), the process proceeds to S24. When the autonomous driving ECU 10 does not determine that the certain time elapses in the state in which the steering holding of the driver is not determined (S23: NO), the current process ends. Thereafter, when the second reference straight steering angle is not acquired yet, the autonomous driving ECU 10 repeats the process from S20.

In S24, the autonomous driving ECU 10 cancels permission of the autonomous driving by the autonomous driving permission unit 16 (autonomous driving permission cancellation step). The autonomous driving ECU 10 ends the autonomous driving cancellation process.

According to the autonomous driving vehicle 1 (the method for controlling the autonomous driving vehicle 1 and the program) described above, when the autonomous driving cannot be permitted because the first reference straight steering angle is acquired but the second reference straight steering angle is not acquired, the autonomous driving is permitted by making the steering holding request for the driver and ensuring steering stability of the autonomous driving vehicle 1, so that the operating rate of autonomous driving can be increased as compared with a case where the autonomous driving is not permitted until both the first reference straight steering angle and the second reference straight steering angle are acquired.

Further, according to the autonomous driving vehicle 1, the steering holding request is repeated when the driver does not perform the steering holding in response to the steering holding request, so that it is possible to encourage the steering holding of the driver who does not perform the steering holding in a state in which the autonomous driving is permitted.

Further, according to the autonomous driving vehicle 1, the autonomous driving permission is cancelled when the time, in which it is determined that the driver does not perform the steering holding without acquisition of the second reference straight steering angle after the autonomous driving is permitted in response to the steering holding request, is continued for a certain time or more, so that it is possible to prevent the autonomous driving from being continued while the steering holding of the driver who acquires the second reference straight steering angle is not performed.

Although the embodiment of the present disclosure is described above, the present disclosure is not limited to the above-described embodiment. The present disclosure can be carried out with the above-described embodiment in various forms having various modifications and improvements based on knowledge of those skilled in the art.

The autonomous driving vehicle 1 (the method for controlling the autonomous driving vehicle 1 and the program, same as below) does not necessarily need to repeat the steering holding request. An aspect may be provided in which the steering holding request may be made only once.

When a certain time elapses in a state in which the driver does not perform the steering holding, the autonomous driving vehicle 1 does not necessarily need to cancel the autonomous driving permission. Further, the autonomous driving vehicle 1 does not need to determine the steering holding of the driver. The autonomous driving vehicle 1 does not essentially need to include the steering holding sensor 6 and the steering holding determination unit 17.

When midpoint learning of the acceleration sensor is acquired in addition to the second reference straight steering angle, the autonomous driving vehicle 1 may be in an aspect of permitting the autonomous driving. The acceleration sensor is a sensor that acquires front-rear acceleration and the lateral acceleration of the autonomous driving vehicle 1. Various well-known methods can be adopted for the midpoint learning of the acceleration sensor. When the vehicle speed and the yaw rate of the autonomous driving vehicle 1 satisfy certain conditions, the autonomous driving ECU 10 of the autonomous driving vehicle 1 may include a midpoint learning unit that performs the midpoint learning of the acceleration sensor based on the acceleration (the front-rear acceleration and the lateral acceleration) detected by the acceleration sensor. In this case, even when the first reference straight steering angle and the second reference straight steering angle are acquired, the autonomous driving permission unit 16 does not to permit the autonomous driving until the midpoint learning of the acceleration sensor is completed, so that, when the steering holding request for the driver is made, the autonomous driving may be permitted.

In addition, when a vehicle stability control system is in an unprepared state due to an abnormality in the steering sensor 5 or when a telescope camera or a rider is malfunctioning (when a distant place cannot be detected but lane keep is possible), the autonomous driving vehicle 1 may permit the autonomous driving by making the steering holding request for the driver even when the autonomous driving cannot be normally permitted.

When a failure (a failure of only the redundant system not a main system) occurs only in a redundant system part for ensuring redundancy of the autonomous driving ECU 10, an electric power steering system, a braking system, or the like, the autonomous driving vehicle 1 may permit the autonomous driving by making the steering holding request for the driver.

What is claimed is:

1. An autonomous driving vehicle capable of executing autonomous driving, comprising:
    an electronic control unit (ECU) programmed to:
    acquire a first reference straight steering angle, which is a steering angle of the autonomous driving vehicle in a straight travelling state, based on lateral acceleration of the autonomous driving vehicle detected from a lateral acceleration sensor, a yaw rate of the autonomous driving vehicle detected from a yaw rate sensor, a vehicle speed of the autonomous driving vehicle detected from a vehicle speed sensor, and a steering angle of the autonomous driving vehicle detected from a steering sensor;
    acquire a second reference straight steering angle which is the steering angle when a magnitude of a difference between an estimated yaw rate estimated from the steering angle of the autonomous driving vehicle and the yaw rate of the autonomous driving vehicle detected from the yaw rate sensor is less than a yaw rate threshold value; and
    determine whether or not to permit an autonomous driving of the autonomous driving vehicle, the autonomous driving being permissible when both the first reference straight steering angle and the second reference straight steering angle are acquired and the autonomous driving not being permissible when the first reference straight steering angle is not acquired; and
    control the autonomous driving of the autonomous driving vehicle based on the determined permissibility, wherein
    the ECU is further configured to make a steering holding request for a driver of the autonomous driving vehicle and permit the autonomous driving of the autonomous driving vehicle when the first reference straight steering angle is acquired but the second reference straight steering angle is not acquired.

2. The autonomous driving vehicle according to claim 1, wherein the ECU is further programmed to:
    determine whether or not the driver performs steering holding, and
    repeatedly requests the steering holding for the driver while it is determined that the driver does not perform the steering holding without acquisition of the second reference straight steering angle after the autonomous driving is permitted in response to the steering holding request.

3. The autonomous driving vehicle according to claim 1, wherein the ECU is further programmed to:
    determine whether or not the driver performs steering holding, and
    cancels permission of the autonomous driving when it is determined that a time in which the driver does not perform the steering holding is continued for a certain time or more without acquisition of the second reference straight steering angle after the autonomous driving is permitted in response to the steering holding request.

4. A method for controlling an autonomous driving vehicle capable of executing autonomous driving, the method comprising:
    acquiring a first reference straight steering angle, which is a steering angle of the autonomous driving vehicle in a straight travelling state, based on lateral acceleration of the autonomous driving vehicle detected from a lateral acceleration sensor, a yaw rate of the autonomous driving vehicle detected from a yaw rate sensor, a vehicle speed of the autonomous driving vehicle detected from a vehicle speed sensor, and a steering angle of the autonomous driving vehicle detected from a steering sensor;
    acquiring a second reference straight steering angle which is the steering angle when a magnitude of a difference between an estimated yaw rate estimated from the steering angle of the autonomous driving vehicle and the yaw rate of the autonomous driving vehicle detected from the yaw rate sensor is less than a yaw rate threshold value;
    determining whether or not to permit an autonomous driving of the autonomous driving vehicle, the autonomous driving being permissible when both the first reference straight steering angle and the second reference straight steering angle are acquired and the autonomous driving not being permissible when the first reference straight steering angle is not acquired; and
    controlling the autonomous driving of the autonomous driving vehicle based on the determined permissibility, wherein
    the autonomous driving of the autonomous driving vehicle is permitted by making a steering holding request for a driver of the autonomous driving vehicle when the first reference straight steering angle is acquired but the second reference straight steering angle is not acquired.

5. A non-transitory computer readable medium having stored thereon instructions which, when executed by at least one ECU, cause the at least one ECU to execute processing comprising:

acquiring a first reference straight steering angle, which is a steering angle of the autonomous driving vehicle in a straight travelling state, based on lateral acceleration of the autonomous driving vehicle detected from a lateral acceleration sensor, a yaw rate of the autonomous driving vehicle detected from a yaw rate sensor, a vehicle speed of the autonomous driving vehicle detected from a vehicle speed sensor, and a steering angle of the autonomous driving vehicle detected from a steering sensor;

acquiring a second reference straight steering angle which is the steering angle when a magnitude of a difference between an estimated yaw rate estimated from the steering angle of the autonomous driving vehicle and the yaw rate of the autonomous driving vehicle detected from the yaw rate sensor is less than a yaw rate threshold value; and determining whether or not to permit an autonomous driving of the autonomous driving vehicle, the autonomous driving being permissible when both the first reference straight steering angle and the second reference straight steering angle are acquired and the autonomous driving not being permissible when the first reference straight steering angle is not acquired; and controlling the autonomous driving of the autonomous driving vehicle based on the determined permissibility, wherein the autonomous driving of the autonomous driving vehicle is permitted by making a steering holding request for a driver of the autonomous driving vehicle when the first reference straight steering angle is acquired but the second reference straight steering angle is not acquired.

* * * * *